UNITED STATES PATENT OFFICE.

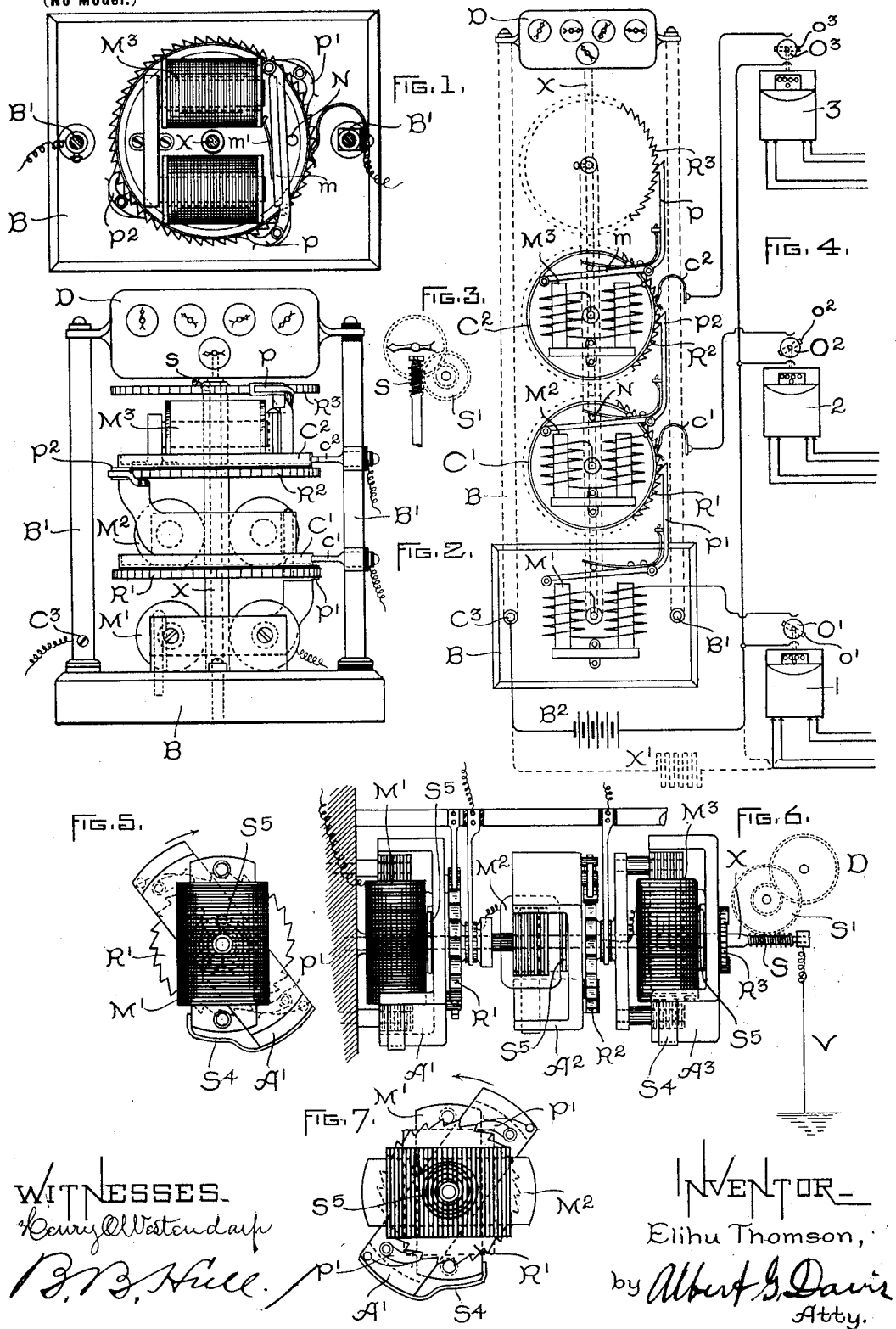

ELIHU THOMSON, OF SWAMPSCOTT, MASSACHUSETTS, ASSIGNOR TO THE GENERAL ELECTRIC COMPANY, OF NEW YORK.

SUMMATION-METER.

SPECIFICATION forming part of Letters Patent No. 635,880, dated October 31, 1899.

Application filed June 20, 1898. Serial No. 683,911. (No model.)

*To all whom it may concern:*

Be it known that I, ELIHU THOMSON, a citizen of the United States, residing at Swampscott, in the county of Essex and State of Massachusetts, have invented certain new and useful Improvements in Summation-Meters, (Case No. 779,) of which the following is a specification.

My present invention relates to measuring-instruments, and although not confined in this respect to any particular device it is of most general application in connection with electric or other meters. It will be readily perceived that it might be applied to any number of electric meters or to uses in connection with measuring devices of other classes, such as gas-meters, the rotation of different shafts, the successive impulses of a number of different machines, or, in general, the integration of a number of different commensurable movements. It might also be applied by arbitrary proportioning to the measurement of totals in different units, if for any reason this should be desirable, as would sometimes occur in those stations operating mixed systems of gas and electric lighting, for instance, where the total output of current and cubic feet of gas might be reduced to a pecuniary basis and recorded in dollars and cents, if desired.

The utility of my invention is manifest. It may be applied to the indication and registration of the total output of a station to great advantage. If the device be located in the engineer's or superintendent's office, it need only be connected to the switchboard by small wires, while the running of the main meter leads so far may be prohibited both on account of first cost and of waste of energy. As applied to devices other than electric meters the same advantage is apparent, the devices being readily operated by a battery of moderate size, as will presently be explained, rendering it unnecessary to have the station-meters in the office-rooms or to leave the office to examine them.

My invention relates to that class of devices in which a number of recording devices of any kind or of separately-moving mechanisms are so connected to a summation dial or meter recording the sum of the movements that each meter device will cause a record to be made upon the dial proportioned to its own register. It is important that in such a device the various elements should be so far independent of each other that all movements are registered, whether they occur simultaneously or at different times. To accomplish this, I have arranged in operative relation with each of the meters (taking the word as typical of any device to which the invention may be applied) a motor mechanism moving the shaft of a register by a desired space at each impulse communicated to it by the meter with which it is connected. Each of these motor devices is capable of moving the shaft independently of the movement of the others; but they are so connected "in tandem," as I have preferred to call it, that this motion is transmitted from any one of the motor devices through all of the others intervening between it and the register. The effect of this arrangement is to actuate the register by the movement of any one of the meter devices, no matter whether the others are moving or stationary, thus independently recording the different impulses communicated to the shaft by the motor devices.

Briefly described, the device in its preferred form contains a motor device, such as an electromagnet, operated at intervals by one of the meters, the sum of whose readings is to be given on the summation-dial. This motor device acts upon each impulse to move a pawl and turn a ratchet-wheel through a definite distance, such as the space of one tooth. This ratchet-wheel, however, carries another motor device or electromagnet actuated by the impulses of a second meter, and this acts in turn upon a ratchet-wheel moved by a pawl and moves what may be called the "second" ratchet in a similar manner. Upon this ratchet-wheel is mounted a third magnet or motor device which actuates a third ratchet-wheel by its pawl, and so on to any number. These wheels are mounted in the same axial line—*i. e.*, around the same shaft—and it will be seen that if the three magnets act at once the motion of the last ratchet is three times as great as with any single impulse.

If two act at once, the motion is twice as great as if a single impulse only were given by one of the magnets. The last moving element of the series is of course made to move a register or indicator showing the sum of all the impulses. This registry may be called the "summation-dial" or set of dials.

In the drawings attached to this specification, which represent an embodiment of my invention, Figure 1 is a plan of the motor mechanism with the register removed. Fig. 2 is a side elevation of the same parts. Fig. 3 is a detail. Fig. 4 is a diagram of circuits. Figs. 5, 6, and 7 show a modified form of the device.

Referring first to Figs. 1, 2, and 3, B is a suitable base for the instrument, having side posts B' B', which support the registering apparatus D. The register is connected with the shaft X by a worm-gear S S'. (Shown in detail in Fig. 3.) Upon the base B is an electromagnet M'. A ratchet-wheel R' carries a similar electromagnet M². A second ratchet R² carries a third magnet M³, and a third ratchet R³ is affixed to the shaft of the counter or register D. The ratchet-wheels R' R² are sleeved upon and revolve independently of the shaft. The general form and arrangement of the electromagnet and its coöperating parts will be understood best from Fig. 1. It will be seen that the magnet M³ acts, when energized, to draw down its armature $m$ against the spring $m'$. This armature is attached to the pawl P, of ordinary construction, which coöperates with the ratchet R³. (Not shown in this figure, but seen in Fig. 2.) Other pawls P' P² serve to similarly rotate the other ratchets. The effect of the action just described is to advance the wheel R³ (and with it the shaft) by one tooth at each impulse of current sent through the magnet M³. The magnet M' (referring again to Fig. 2) when energized rotates the wheel R', as just described with reference to wheel R³. The magnet M², carried on the wheel R' and rotating with it, affects by its pawl the wheel R², while the magnet M³, which is carried on the wheel R², moves the wheel R³. The pawls are of course provided with stops, as at N, Fig. 1, by which their backward movements are limited. It will be seen that the three magnets and their pawls, with the ratchets, constitute motor devices connected in tandem, so that by the movement of the magnet M', for instance, the ratchet R' is moved, carrying with it the magnet M². The latter moves the ratchet R², carrying with it the magnet M³, and this last moves the ratchet R³. The motions of the ratchets R' R² do not affect the shaft X directly, but only rotate the ratchet R³, the latter being secured to the shaft by the set-screw $s$. The magnet M' is connected directly with the main.

Referring to Fig. 4, it will be seen that each meter 1 2 3 operates a device O' O² O³, each of which devices closes, respectively, the circuit of one of the magnets M' M² M³. For example, when the contact-strip $o'$, carried by the disk O', is in a vertical position current flows from the battery B² through the strip $o'$ to the coils of the magnet M', to the shaft X, and thence back to B² through the connection C³; but since the magnets M² M³ rotate about the shaft X current is carried to them, respectively, through the rings C' C² and brushes $c'$ $c^2$. It will be obvious that the battery B² may be replaced by any suitable source of current—as, for example, by a shunt from the main, as shown in dotted lines. I have shown a resistance X' to limit the current. When the switch O', for instance, is closed by the revolution of the meter 1, an impulse of current will be sent through the magnet M' from the battery, and this will cause the magnet to attract its armature, pull over its pawl, and rotate the ratchet R', this motion being transmitted to the ratchet R³ and thence to the shaft. A similar action will occur when either of the other switches is momentarily closed.

It is manifest that the general arrangement outlined is susceptible of many embodiments, the one which I have shown being only one of a number which may be adopted.

In Figs. 5, 6, and 7 I show a modified form which may be employed. The circuits of this modification are not specifically illustrated, because they are substantially the same as those shown in Fig. 4. In connection with this device I show a grounded circuit at V, which would involve grounding one end of the battery; but otherwise the circuits would be the same, the particular circuit connections forming no essential part of the invention. In this arrangement I employ a horizontal shaft instead of a vertical one, and electromagnets M' M², &c., consisting of straight bars with single coils—such, for instance, as shown in Fig. 5. The armatures A' A², &c., are bent bars, which rotate when attracted in the direction of the arrow, Fig. 5, so as to close the magnetic circuit of the magnets M', &c. In so doing they rotate the ratchet R' R². Suitable pawls connect the armatures with the ratchets, and stops S⁴ prevent the armatures from getting so far out of line as to be out of the inductive influence of the magnet. Returning-springs S⁵ (in the case illustrated ordinary helical springs) are also employed. The general arrangement of this mechanism is the same as that already particularly described with reference to Figs. 1 and 2. The armature A', Fig. 6, rotates the ratchet R', and this in turn rotates the magnet M² and its armature A², the latter rotating the ratchet R², which rotates the magnet M³ and armature A³, to the latter of which is connected the ratchet R³, fast upon the shaft X, geared to the worm S.

In Fig. 7 I show a view of the magnet M² with its armature removed, looking in the opposite direction from Fig. 5. The rotation is as shown by the arrow, the armature A' being provided with a stop S⁴, as shown in Fig. 5. The operation of this part of the device will be apparent without further description.

It will thus be seen that I provide a number of independent registers, each of which acts upon one of a train of wheels capable of relative movement, so that each meter may actuate the summation-meter irrespective of its companion meters, whether operating simultaneously or dissimultaneously with them.

What I claim as new, and desire to secure by Letters Patent of the United States, is—

1. The combination of a number of recording devices independently effecting desired registrations, a separate motor device controlled by each register, a summation-register for all the motors, and gearing between the motors and the register such that each motor actuates the summation-register to record the movement of its own controlling device independently of the other motors.

2. The combination of a number of electric meters, an electric-motor device in circuit with each meter and with a source of power, a summation-register, gearing connecting each motor to the summation-register in such manner that the movement of each motor is recorded independently of any other, and means actuated by the meters for sending current through their respective motors.

3. The combination of electric meters, an electromagnet in circuit with each meter, switches periodically actuated by each meter to send current through the electromagnets, a summation-register, and a "tandem" connection between the register and the electromagnets.

4. The combination of a number of meters, each having a motor actuated by and in proportion to its registering movement, a summation-register, and mechanical connections between the motor and the register, such that each motor actuates the register to record its own movement unaffected by the movement of the other motors.

5. The combination of a number of meters, a corresponding number of motors, a summation-register actuated by the motors, interconnections between the motors and means for proportioning the range of movement of the summation-register to the sum of the meter registrations.

6. The combination of a number of meters, a motor connected to each meter and actuated proportionately to its registration, the several meters being interconnected, and a summation-register recording the movements of all the motors whether acting simultaneously or dissimultaneously.

7. The combination of a number of mechanisms, such as rotating shafts or the like, the sum of the movements of which is to be noted upon a single record, such as a register, counter, or similar device, with motors controlled, respectively, by the different mechanisms, each recording its own movement upon the register, and interconnections between the motors to prevent the interference of their several registrations, whether operating simultaneously or dissimultaneously.

8. The combination of a register, a shaft actuating it, a ratchet device revolving loosely on the shaft, another ratchet device keyed to the shaft, a fixed electromagnet operating the first ratchet, and an electromagnet carried by the first ratchet and operating the second; whereby the register is moved in accordance with the number of impulses of the magnets, whether or not the impulses occur synchronously.

9. A summation-meter comprising a train of wheels each independently operated by a particular meter of a series to be integrated, said train acting upon the summation-register, and connections between the several wheels to permit each to be impelled irrespective of the others, thereby rendering their action summative, whether impelled simultaneously or dissimultaneously.

In witness whereof I have hereunto set my hand this 16th day of June, 1898.

ELIHU THOMSON.

Witnesses:
 DUGALD MCKILLOP,
 JOHN MCMANUS.